March 1, 1932.  F. H. SAWYER  1,847,985
SEWER DRAG
Filed March 19, 1931
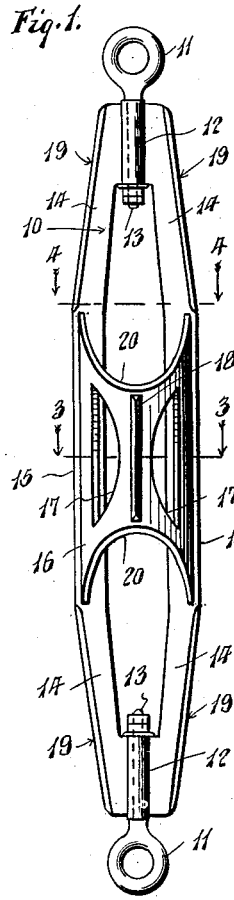
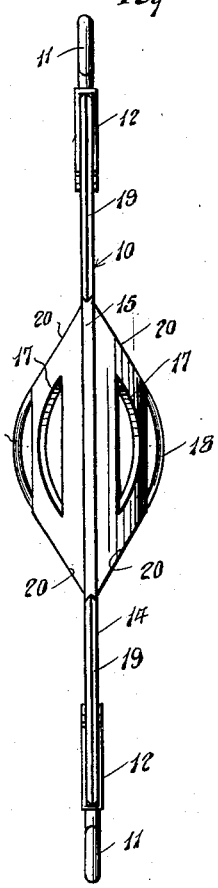
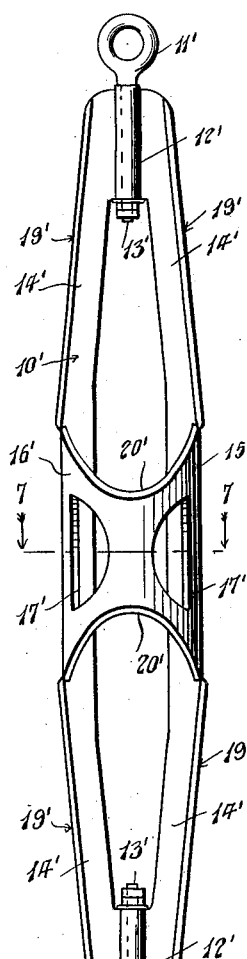
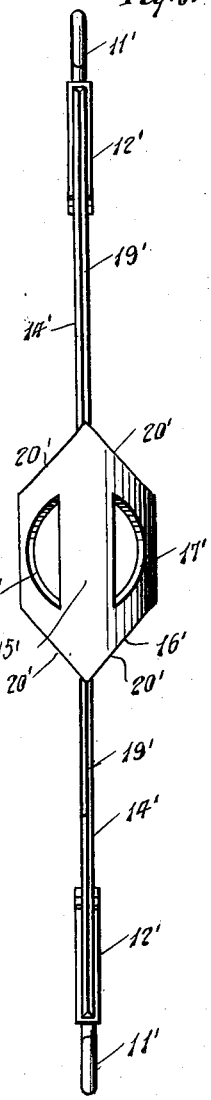
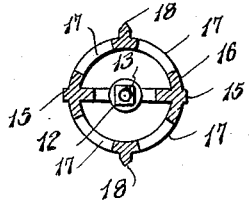
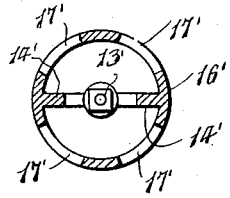
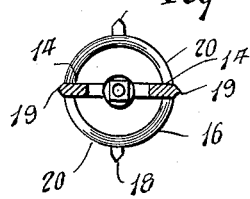
Inventor
F. H. Sawyer.
By L. F. Rudolph Jr.
Attorney Patented Mar. 1, 1932

1,847,985

UNITED STATES PATENT OFFICE

FRED H. SAWYER, OF LOS ANGELES, CALIFORNIA

SEWER DRAG

Application filed March 19, 1931. Serial No. 523,925.

This invention relates to a device adapted to be dragged or drawn through sewers or piping in order to remove stones, or in fact any hard or soft substance such as may accumulate therein and for instance shale, grease, soap, lime, small gravel, sand or rocks.

A particular object is to provide a novel construction which will readily pass through the pipes notwithstanding rough or misfit joints.

It is also aimed to provide a novel construction which may be rapidly operated and which will cut or separate soft substance.

The more specific objects and advantages will become apparent from a consideration of the description following taken in connection with accompanying drawings illustrating an operative embodiment.

In said drawings:—

Figure 1 is a front view in elevation of one form of my sewer drag,

Figure 2 is a side view,

Figures 3 and 4 are sectional views on planes indicated by lines 3—3 and 4—4 in Figure 1, Figure 5 is a front view in elevation of another form of the sewer drag and used as a follower for the drag shown in Figures 1 to 4, Figure 6 is a side view of the drag shown in Figure 5, and Figure 7 is a sectional view on a plane indicated by the line 7—7 of Figure 5.

In the drawings similar reference characters are used to designate corresponding parts in the several views.

In the form shown in Figures 1 to 4, the drag comprises a body 10 which is preferably cast or formed of a single piece of metal and which has eye members 11 at opposite ends, which are swivelled in elongated bearings 12 forming part of the body and which are secured in place by suitable nuts or fastenings 13 secured to the inner ends of the eye members. Cables or the like may be fastened to either or both of the eyelet members 11 and operated to draw the device through a sewer or piping.

At opposite ends of the body, inclined guide arms 14 are provided. The arms 14 are connected by straight portions 15 with which webs 16 are connected. It will be noted that the webs 16 are of skeleton form since openings 17 are provided therethrough and that cutting blades 18, are provided on the webs.

The outer edges 19 of the guide arms are preferably sharpened as shown and the ends of the webs 16 as at 20 are preferably concave and sharpened as shown.

As a result of the construction described, the body is widest or of greatest girth at the center and hence the reduced ends enable it to better pass over and engage stones in order to drag them. The device will also better slip over pipe joints in view of the concavities at 20 and relatively soft material will be cut as an aid to removal by the edges 18, 20 and 19. The openings 17, relieve pressure in cutting material since if there is much matter in the pipes, the pressure on the pipe would be too great for it to stand and it would burst.

The form shown in Figures 5, 6 and 7 is preferably of a heavier construction than the first mentioned form and is designed to follow it by being connected thereto by a suitable flexible element such as a cable. In this form the body of the drag is designated 10' and is provided with eye members 11', at its two ends, and swivelled in elongated bearings 12', the fastening means being designated 13'.

Body 10' has its opposite ends provided with inclined guide arms 14', the intermediate straight portion 15' having the skeleton webs 16' connected therewith. The cutting blades 18 of the first form are omitted in this form, but the outer edges of the arms 14' are sharpened as shown at 19' and the skeleton webs 16' have their edges 20' sharpened. In this form the webs 16' are also provided with openings 17' to relieve pressure in the pipe in cutting the impacted material therein as above stated in relation to the openings 17.

Various changes may be resorted to provided they fall within the spirit and scope of the invention.

I claim as my invention:—

1. A drag comprising a body having guide arms at the opposite ends thereof, said guide arms being inclined to one another at each end of the body, webs intermediate said ends, cutters on the edges of said arms, and other cutters extending longitudinally of the webs.

2. A drag comprising a body having guide arms at the opposite ends thereof, said guide arms being inclined to one another at each end of the body, webs intermediate said ends, cutters on the edges of said arms, and other cutters extending longitudinally of the webs, the ends of said webs being arcuate.

3. A drag comprising a body having guide arms at the opposite ends thereof, said guide arms being inclined to one another at each end of the body, webs intermediate said ends, cutters on the edges of said arms, other cutters extending longitudinally of the webs, and said webs being of skeleton form.

4. A drag comprising a body having guide arms at the opposite ends thereof, said guide arms being inclined to one another at each end of the body, cutters on the edges of said arms, straight arms connecting the guide arms, webs connecting the straight arms, said webs being of skeleton form and having arcuate ends, and cutters carried by and extending longitudinally of the webs.

In testimony whereof I affix my signature.

FRED H. SAWYER.